US010855676B2

(12) United States Patent
Chandrasekharan et al.

(10) Patent No.: US 10,855,676 B2
(45) Date of Patent: *Dec. 1, 2020

(54) AUDIO VERIFICATION

(71) Applicant: Oath Inc., New York, NY (US)

(72) Inventors: Manjana Chandrasekharan, Los Angeles, CA (US); Keiko Horiguchi, Palo Alto, CA (US); Amanda Joy Stent, Chatham, NJ (US); Ricardo Alberto Baeza-Yates, Palo Alto, CA (US); Jeffrey Kuwano, San Jose, CA (US); Achint Oommen Thomas, Milpitas, CA (US); Yi Chang, Milpitas, CA (US)

(73) Assignee: Oath Inc., New York, NY (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/398,940

(22) Filed: Apr. 30, 2019

(65) Prior Publication Data

US 2019/0260731 A1 Aug. 22, 2019

Related U.S. Application Data

(63) Continuation of application No. 14/847,742, filed on Sep. 8, 2015, now Pat. No. 10,277,581.

(51) Int. Cl.
*H04L 29/06* (2006.01)
*G06F 3/16* (2006.01)
(Continued)

(52) U.S. Cl.
CPC ............ *H04L 63/083* (2013.01); *G06F 3/165* (2013.01); *G06F 3/167* (2013.01); *G06F 21/31* (2013.01);
(Continued)

(58) Field of Classification Search
CPC ..... H04L 63/083; H04L 9/3226; G06F 21/31; G10L 17/06; G10L 21/003; G10L 25/51
See application file for complete search history.

(56) References Cited

U.S. PATENT DOCUMENTS 8,036,902 B1 * 10/2011 Strom ................. G06F 21/31
704/275
8,667,566 B2 * 3/2014 Lazar ................. G06F 21/31
726/4
(Continued)

OTHER PUBLICATIONS

Gao, Haichang; Liu, Honggang; Yao, Dan; Liu, Xiyang; Aickelin, Uwe; "An audio CAPTCHA to distinguish humans from computers", Third International Symposium on Electronic Commerce and Security, IEEE, Jul. 29-31, 2010, pp. 265-269.*

(Continued)

*Primary Examiner* — Victor Lesniewski
(74) *Attorney, Agent, or Firm* — Cooper Legal Group, LLC

(57) ABSTRACT

One or more techniques and/or systems are provided for audio verification. An audio signal, comprising a code for user verification, may be identified. A second audio signal is created comprising speech. The audio signal and the second audio signal may be altered to comprise a same or similar volume, pitch, amplitude, and/or speech rate. The audio signal and the second audio signal may be combined to generate a verification audio signal. The verification audio signal may be presented to a user for the user verification. Verification may be performed to determine whether the user has access to content or a service based upon user input, obtained in response to the user verification audio signal, matching the code within the user verification audio signal. In an example, the user verification may comprise verifying that the user is human.

20 Claims, 10 Drawing Sheets

(51) Int. Cl.
  *G10L 17/06* (2013.01)
  *H04L 9/32* (2006.01)
  *G10L 25/51* (2013.01)
  *G10L 21/003* (2013.01)
  *G06F 21/31* (2013.01)

(52) U.S. Cl.
  CPC ............ *G10L 17/06* (2013.01); *G10L 21/003* (2013.01); *G10L 25/51* (2013.01); *H04L 9/3226* (2013.01); *G06F 2221/2133* (2013.01)

(56) References Cited

U.S. PATENT DOCUMENTS

| | | | | |
|---|---|---|---|---|
| 8,793,135 | B2* | 7/2014 | Lewis | G10L 17/24 704/273 |
| 9,263,055 | B2* | 2/2016 | Agiomyrgiannakis | G10L 21/003 |
| 9,519,766 | B1* | 12/2016 | Bhosale | G06F 21/32 |
| 9,686,269 | B2* | 6/2017 | Fu | H04L 63/0823 |
| 9,985,943 | B1* | 5/2018 | Reading | G06F 21/31 |
| 10,277,581 | B2* | 4/2019 | Chandrasekharan | G06F 3/167 |
| 2004/0019479 | A1* | 1/2004 | Hillis | G10K 11/175 704/200.1 |
| 2007/0201660 | A1* | 8/2007 | Lan | H04M 3/436 379/201.01 |
| 2007/0203698 | A1* | 8/2007 | Mapes-Riordan | H04K 3/825 704/231 |
| 2008/0091417 | A1* | 4/2008 | Endo | G10L 21/04 704/207 |
| 2009/0055193 | A1* | 2/2009 | Maislos | G06F 21/32 704/273 |
| 2009/0319270 | A1* | 12/2009 | Gross | G10L 17/04 704/246 |
| 2009/0328150 | A1* | 12/2009 | Gross | A63F 13/215 726/3 |
| 2010/0014692 | A1* | 1/2010 | Schreiner | H04S 3/008 381/119 |
| 2010/0017193 | A1* | 1/2010 | Runge | G06F 40/58 704/8 |
| 2010/0049526 | A1* | 2/2010 | Lewis | G10L 17/005 704/273 |
| 2010/0095350 | A1* | 4/2010 | Lazar | G06F 21/36 726/3 |
| 2012/0090028 | A1* | 4/2012 | Lapsley | H04L 63/1416 726/22 |
| 2012/0204225 | A1* | 8/2012 | Cohen | G06F 21/32 726/3 |
| 2013/0031641 | A1* | 1/2013 | Fisk | G06F 21/31 726/28 |
| 2013/0182866 | A1* | 7/2013 | Kobayashi | H04K 3/84 381/73.1 |
| 2013/0216027 | A1* | 8/2013 | Rados | H04L 63/08 379/32.01 |
| 2013/0218566 | A1* | 8/2013 | Qian | G10L 13/033 704/260 |
| 2014/0020084 | A1* | 1/2014 | Gross | G10L 15/02 726/16 |
| 2014/0163986 | A1* | 6/2014 | Lee | G10L 17/00 704/248 |
| 2014/0359736 | A1* | 12/2014 | Harty | H04L 63/0861 726/7 |
| 2015/0025889 | A1* | 1/2015 | Trammell | G10L 25/51 704/246 |
| 2015/0193776 | A1* | 7/2015 | Douglas | G06Q 20/4012 705/16 |
| 2016/0019380 | A1* | 1/2016 | Miyasato | G06F 16/5866 726/5 |
| 2016/0071524 | A1* | 3/2016 | Tammi | G11B 27/005 386/343 |
| 2016/0210982 | A1* | 7/2016 | Sherman | G10L 21/003 |
| 2016/0307560 | A1* | 10/2016 | Sorin | G10L 13/0335 |
| 2016/0315771 | A1* | 10/2016 | Chalamala | H04L 9/321 |

OTHER PUBLICATIONS

Bursztein, Elie; Beauxis, Romain; Paskov, Hristo; Perito, Daniele; Fabry, Celine; Mitchell, John; "The Failure of Noise-Based Non-Continuous Audio Captchas", Symposium on Security and Privacy, IEEE, May 22-25, 2011, pp. 19-31.*

* cited by examiner

AUDIO VERIFICATION

CROSS REFERENCE TO RELATED APPLICATION

This application claims priority to and is a continuation of U.S. application Ser. No. 14/847,742, filed on Sep. 8, 2015, entitled "AUDIO VERIFICATION", which issued on Apr. 30, 2019 as U.S. Pat. No 10,277,581 and is incorporated by reference herein in its entirety.

BACKGROUND

Captchas (Completely Automated Public Turing test to tell Computers and Humans Apart) may be utilized to restrict non-humans (e.g., computers, program account-creation bots (bots), etc.) from accessing content and/or services. For example, a bot may rapidly create multiple accounts with a service provider for illegal/malicious activity. Audio captchas may be utilized to prevent bots from rapidly generating accounts. However, many bots may have an audio recognition component that may "listen" to an audio captcha and identify a verification code. Thus, the service provider may attempt to generate more complex captchas to restrict bots from accessing an account creation interface. However, a more complex captcha may be less usable for a user of the service provider. Unfortunately, the user of the service provider may become frustrated with the complex captcha. Thus, users may become dissatisfied with the service provider and/or forgo creating an account with the service provider.

SUMMARY

In accordance with the present disclosure, one or more systems and/or methods for audio verification are provided. In an example, an audio signal (e.g., a whisper) comprising a code for user verification may be identified. A second audio signal may be created utilizing a first audio segment and/or a second audio segment. In an example, the first audio segment and/or the second audio segment may be extracted in real-time from an on-going audio stream, extracted from an audio content database, and/or generated utilizing a speech generator (e.g., a random speech generator). One or more portions may be extracted (e.g., randomly extracted) from the first audio segment and/or the second audio segment, and may be stitched together to create the second audio signal. In an example, the one or more portions may be layered (e.g., randomly layered) over each other to create a layered segment and a second layered segment. The layered segment and the second layered segment may be stitched together to create the second audio signal. In another example, the one or more portions may be stitched together to create an initial second audio signal. The initial second audio signal may be reversed to create the second audio signal.

A pitch, a volume, a speaking rate, and/or an amplitude of the audio signal may be identified. A second pitch, a second volume, a second speaking rate, and/or a second amplitude of the second audio signal may be identified. The pitch and/or the second pitch may be altered until the pitch and the second pitch are within a threshold pitch similarity. The volume and/or the second volume may be altered until the volume and the second volume are within a threshold volume similarity. The speaking rate and/or the second speaking rate may be altered until the speaking rate and the second speaking rate are within a threshold speaking rate similarity. The amplitude and/or the second amplitude may be altered until the amplitude and the second amplitude are within a threshold amplitude similarity.

The audio signal and the second audio signal may be combined to generate a verification audio signal comprising the code. Verification may be performed to determine whether the user has access to content or a service based upon user input, obtained in response to the user verification audio signal, matching the code within the user verification audio signal. In an example, the user may be presented with an option to enter the user input audibly. Responsive to the user entering the user input audibly, acoustic features that are indicative of a human voice may be identified. Responsive to the acoustic features indicating the user input, corresponding to the code, was spoken by the human voice, the user may be verified as having access to the content or the service. Responsive to the acoustic features indicating the user input was not spoken by the human voice, the user may be denied access to the content or the service.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
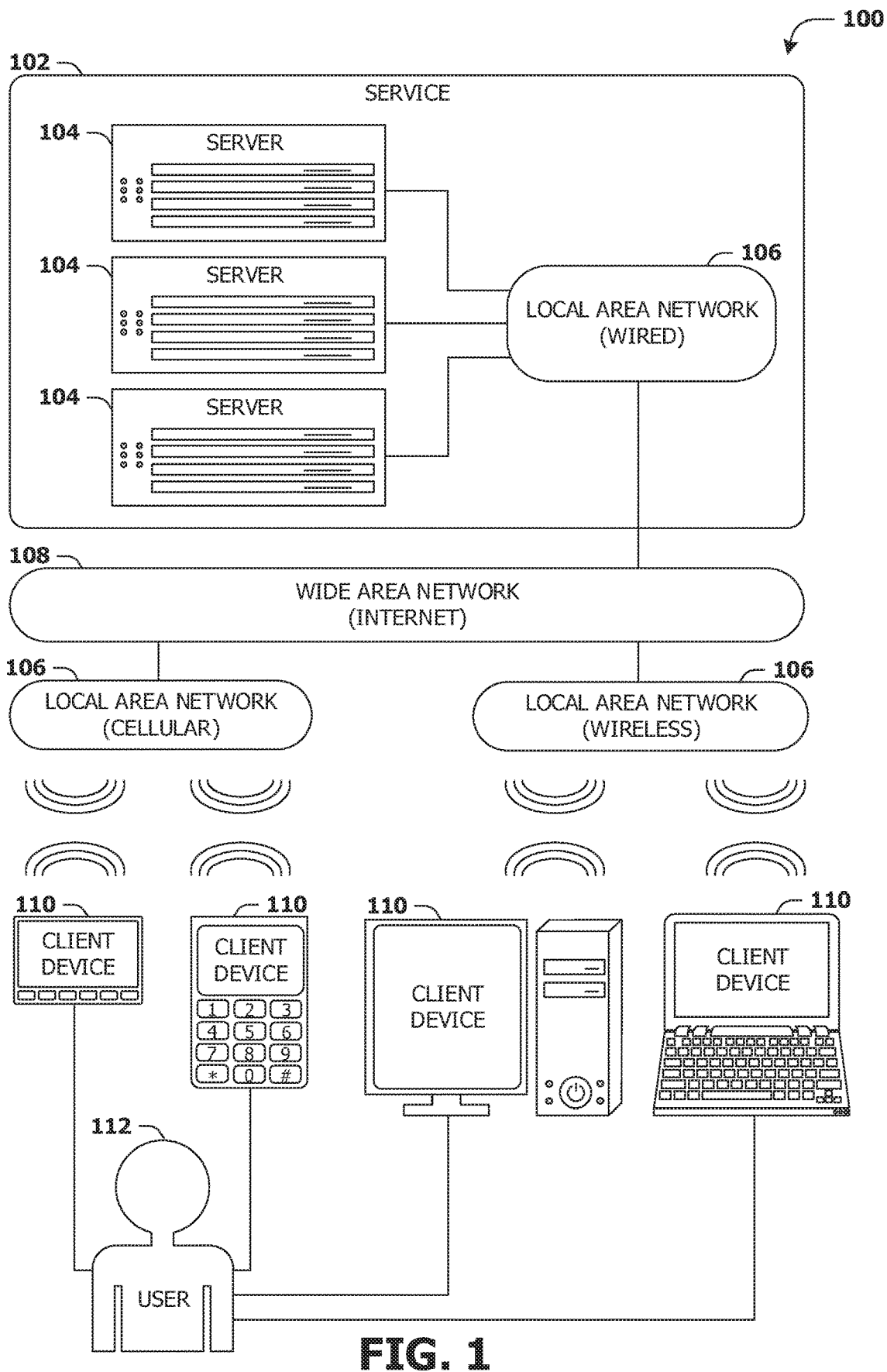
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
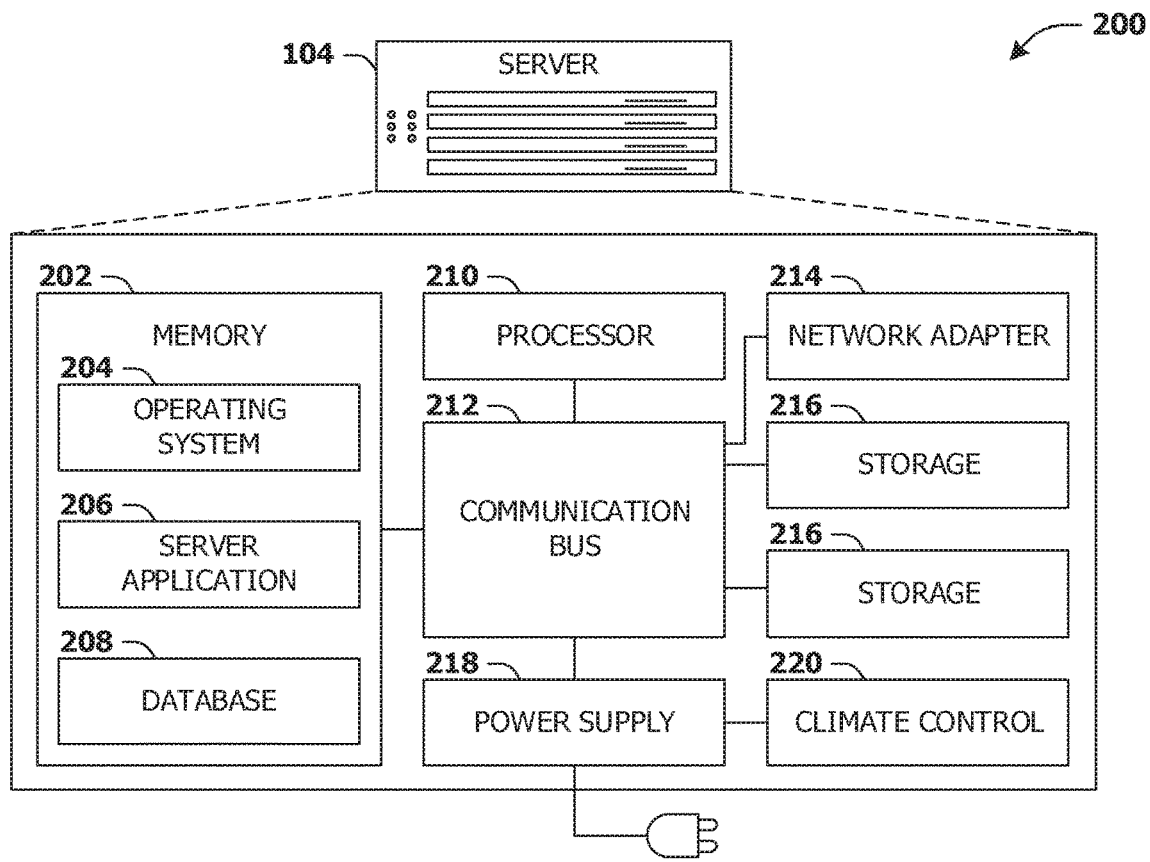
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
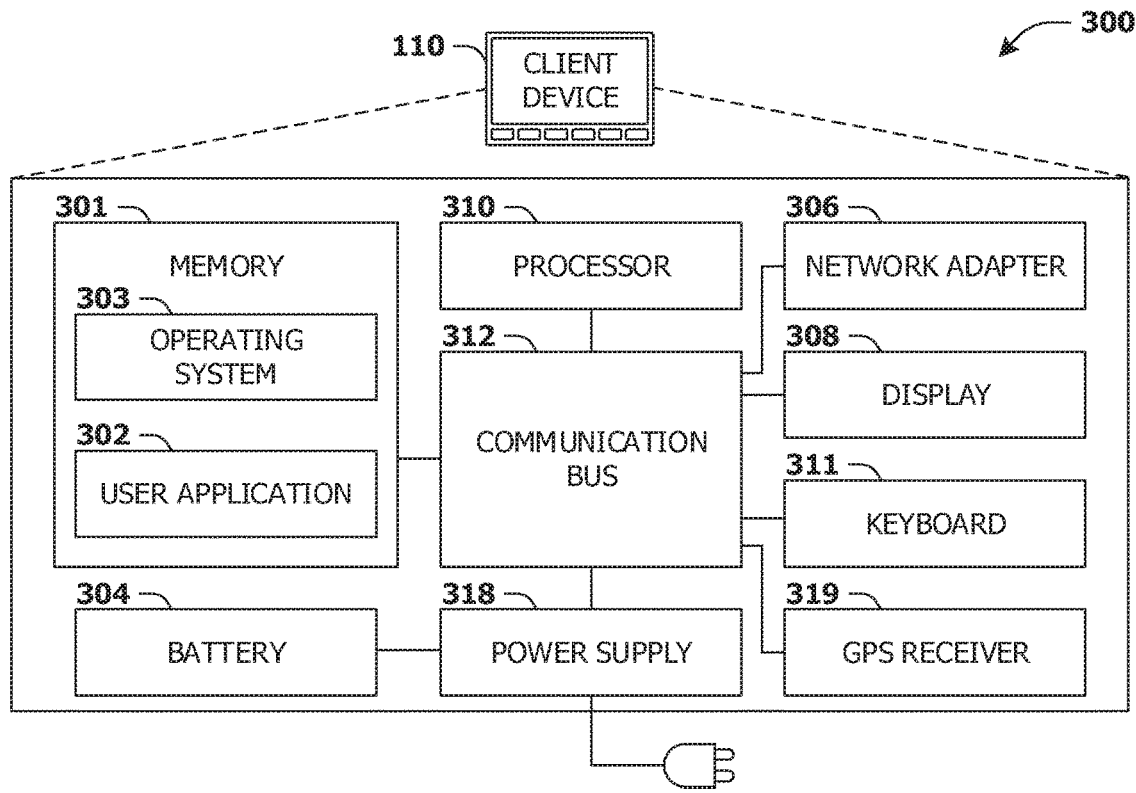
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for audio verification are provided. A content provider and/or service provider (e.g., a webmail provider, a social media provider, a videogame provider, etc.) may desire to prevent bots (e.g., computers, program account-creation bots, etc.) from creating accounts. For example, a bot may rapidly create multiple webmail accounts to use in a phishing scheme. Audio captchas may be utilized to prevent bots from generating webmail accounts. However, many bots may have an audio recognition component that may be able to "listen" to an audio captcha and identify a verification code.

As provided herein, two combined audio signals, such as an audio signal comprising a verification code for user verification and a second audio signal comprising speech (e.g., a conversation, a news report, etc.), may be utilized to restrict a bot from identifying the verification code, while a user may easily identify the verification code (e.g., based upon a Cocktail Party effect). The audio signal and the second audio signal may be altered to comprise a pitch, volume, amplitude, and/or speech rate within a threshold similarity. In this way, an audio captcha is generated using the audio signal and the second audio signal having similar audio features (e.g., pitch, amplitude, speech rate, volume, etc.), such that a bot may be unable to identify the verification code within the audio signal. Otherwise, if the audio captcha is generated where the audio signal, comprising the verification code, and the second audio signal have distinct pitches corresponding to two different frequencies, then the bot could merely subtract a frequency of the second audio signal in order to identify the verification code in the audio signal. While the bot may be unable to identify the verification code, the user may easily identify the verification code, similar to how the user may be able to carry on a conversation with another person in a room full of people having conversations.

Figure 4:
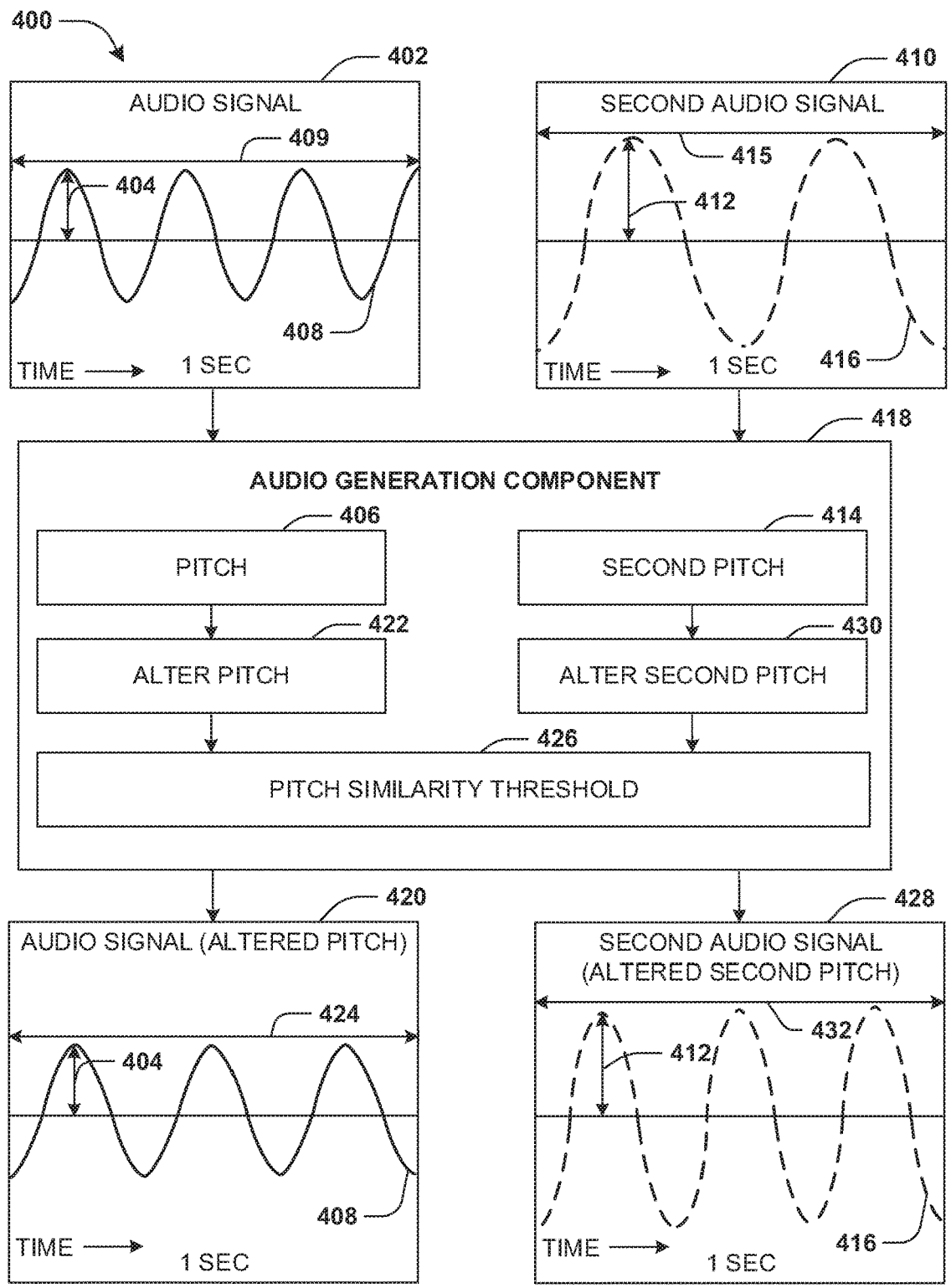
FIG. 4 is a component block diagram illustrating an example system for audio verification, where a pitch and/or a second pitch are altered.

FIG. 4 illustrates an example system 400 for audio verification utilizing an audio generation component 418. An audio signal 402 and a second audio signal 410 may be identified. The audio signal 402 may comprise a code for user verification (e.g., alpha and/or numeric). The second audio signal 410 may comprise speech (e.g., a conversation between one or more persons, a news report, a song, etc.). The audio signal 402 may comprise a sound wave (e.g., a signal propagated over time) depicted by a line 408. The audio generation component 418 may identify an amplitude 404 and a frequency 409 of the sound wave. The audio generation component 418 may identify a pitch 406 proportional to the frequency 409 of the audio signal 402. The second audio signal 410 may comprise a second sound wave depicted by a second line 416. The audio generation component 418 may identify a second amplitude 412 and a second frequency 415 of the second sound wave. The audio generation component 418 may identify a second pitch 414 proportional to the second frequency 415 of the second audio signal 410.

The audio generation component 418 may alter the pitch 406 and/or the second pitch 414 until the pitch 406 and the second pitch 414 are within a threshold pitch similarity. In an example, the pitch 406, of the audio signal 402, may be altered to an altered pitch 422 within a pitch similarity threshold 426 of the second pitch 414 of the second audio signal 410 (e.g., a frequency difference of less than 100 Hz or some other difference), resulting in an altered audio signal 420 having a corresponding frequency 424. In another example, the second pitch 414, of the second audio signal 410, may be altered to an altered second pitch 430 within the pitch similarity threshold 426 of the pitch 406 of the audio signal 402, resulting in an altered second audio signal 428 having a corresponding frequency 432. It may be appreciated that various techniques, such as altering the audio signal 402, the second audio signal 410, or both audio signals (e.g., based upon a mean or average frequency or pitch) may be performed.

Figure 5:
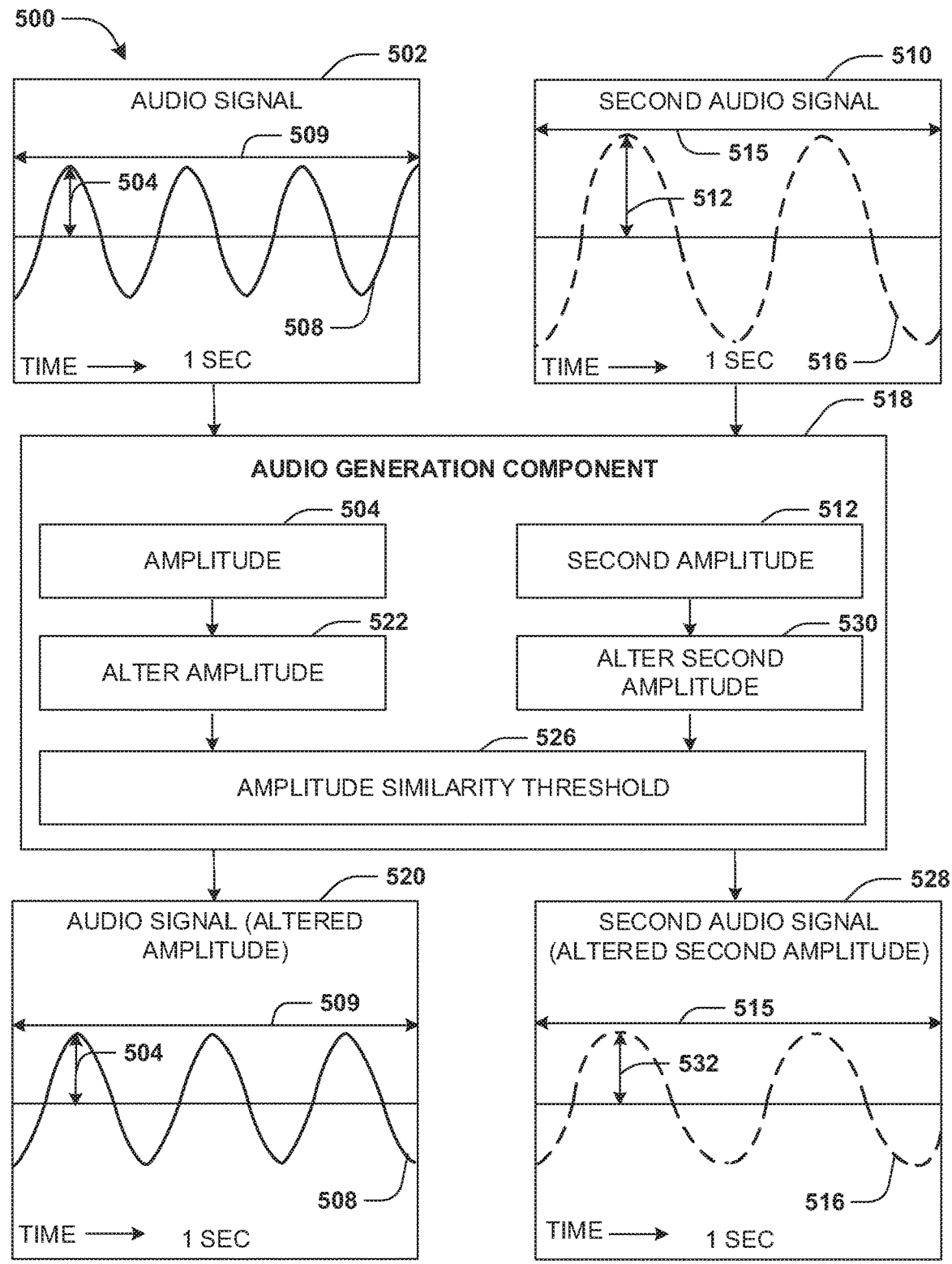
FIG. 5 is a component block diagram illustrating an example system for audio verification, where an amplitude and/or a second amplitude are altered.

FIG. 5 illustrates an example system 500 for audio verification utilizing an audio generation component 518. An audio signal 502 and a second audio signal 510 may be identified. The audio signal 502 may comprise a code for user verification (e.g., 1234). The audio signal 502 may comprise a sound wave depicted by a line 508. The audio generation component 518 may identify an amplitude 504 and a frequency 509 of the sound wave. The second audio signal 510 may comprise speech (e.g., computer generated speech). The second audio signal 510 may comprise a second sound wave depicted by a line 516. The audio generation component 518 may identify a second amplitude 512 and a second frequency 515 of the second sound wave.

Figure 6:
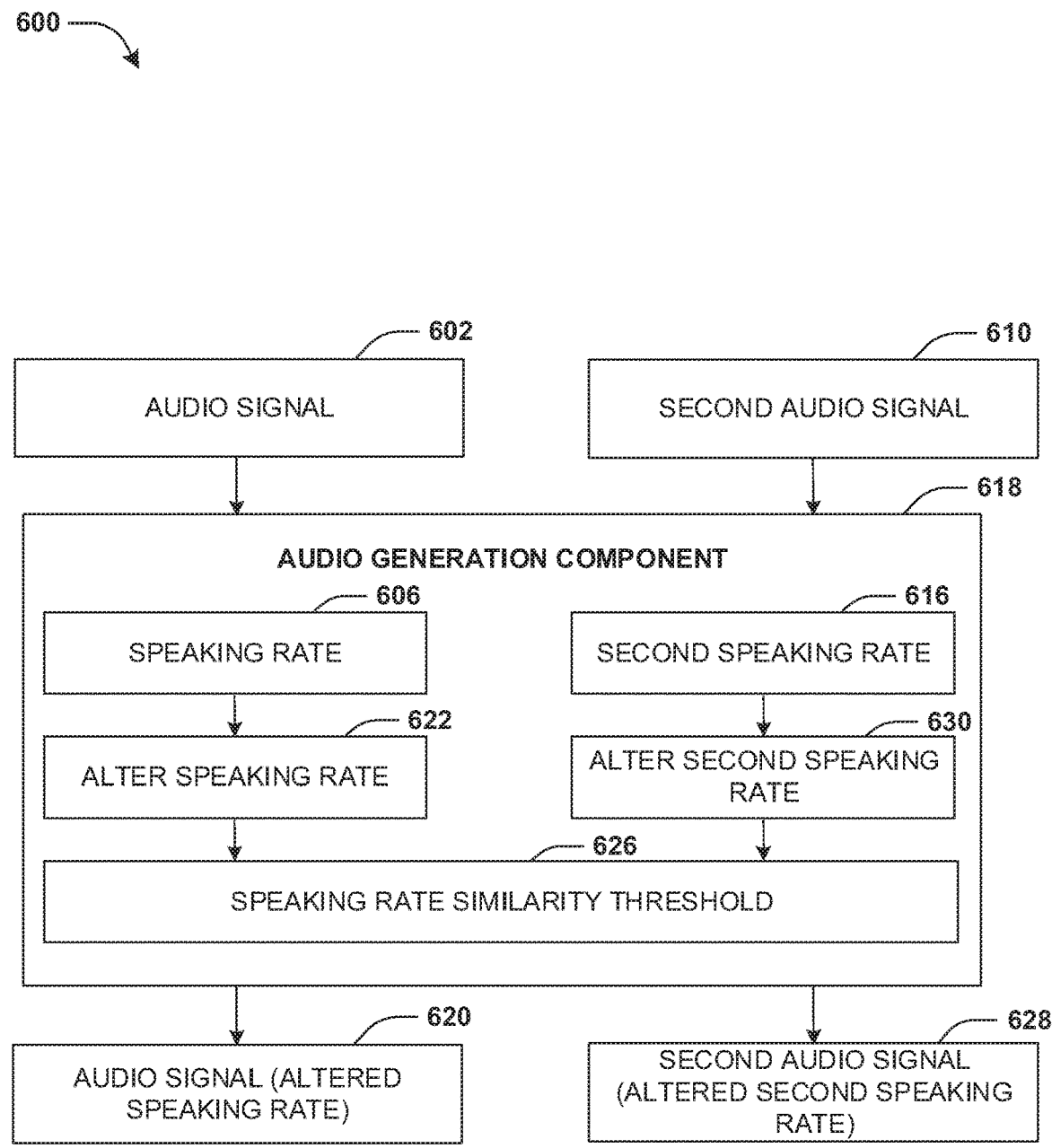
FIG. 6 is a component block diagram illustrating an example system for audio verification, where a speaking rate and/or a second speaking rate are altered.

The audio generation component 518 may alter the amplitude 504 and/or the second amplitude 512 until the amplitude 504 and the second amplitude 512 are within a threshold amplitude similarity 526. In an example, the amplitude 504, of the audio signal 502, may be altered to an altered amplitude 522 within an amplitude similarity threshold 526 of the second amplitude 512 of the second audio signal 510 (e.g., an amplitude difference of less than 0.2 N/m$^2$ or some other amplitude difference), resulting in an altered audio signal 520. In another example, the second amplitude 512, of the second audio signal 510, may be altered to an altered second amplitude 530 within the amplitude similarity threshold 526 of the amplitude 504 of the audio signal 502, resulting in an altered second audio signal 528. It may be appreciated that various techniques, such as altering the audio signal 502, the second audio signal 510, or both audio signals (e.g., based upon a mean or average amplitude) may be performed FIG. 6 illustrates an example system 600 for audio verification utilizing an audio generation component 618 to alter a speaking rate 606 of an audio signal 602 and/or a second speaking rate 616 of a second audio signal 610. The audio signal 602 may comprise a code for user verification. The second audio signal 510 may comprise speech. The audio generation component 618 may identify the speaking rate 606 of the audio signal 602 and the second speaking rate 616 of the second audio signal 610.

The audio generation component 618 may alter the speaking rate 606 and/or the second speaking rate 616 until the speaking rate 606 and the second speaking rate 616 are within a speaking rate similarity threshold 626. In an example, the audio signal 602 may have the speaking rate 606 of 0.3 words per second and the second audio signal 610 may have the second speaking rate 616 of 1.1 words per second. In an example, the second speaking rate 616 may be increased to about 1.1 words per second and the speaking rate 606 may remain unchanged. In another example, the speaking rate 606 may be decreased to about 0.3 words per second and the second speaking rate 616 may remain unchanged. In another example, a mean or average speaking rate between the speaking rate 606 and the second speaking rate 616 may be determined. The speaking rate 606 and the second speaking rate 616 may be altered to comprise the mean or average speaking rate. The audio generation component 618 may output the audio signal 602, having the speaking rate 606 or the altered speaking rate 622, and the second audio signal 610, having the second speaking rate 616 or the altered second speaking rate 630. The speaking rate similarity threshold 626 may comprise a speaking rate difference of 0.1 words per second or some other difference.

Figure 7:
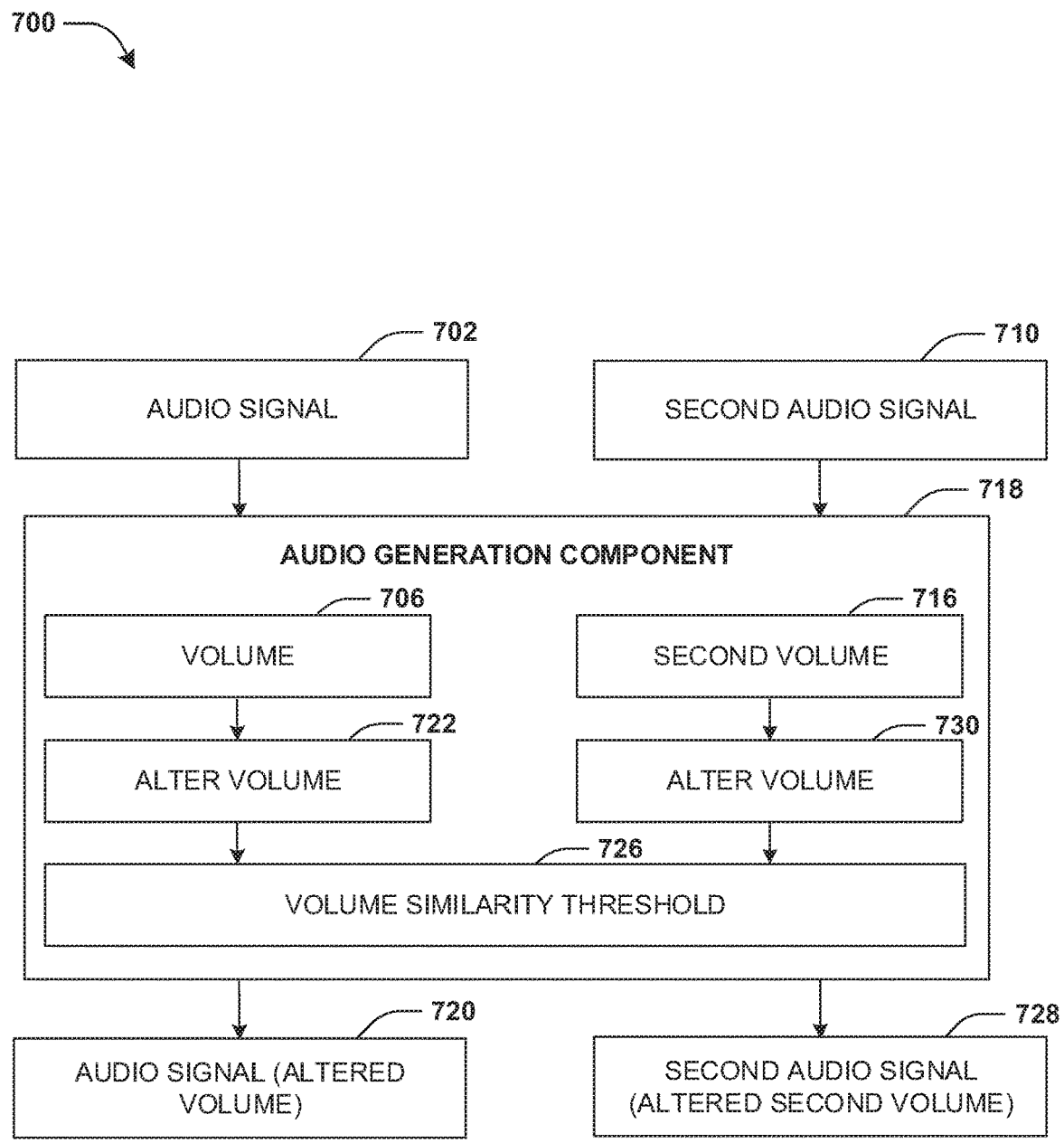
FIG. 7 is a component block diagram illustrating an example system for audio verification, where a volume and/or a second volume are altered.

FIG. 7 illustrates an example system 700 for audio verification utilizing an audio generation component 718 to alter a volume 706 of an audio signal 702 and/or a second volume 716 of a second audio signal 710. The audio signal 702 may comprise a code for user verification. The second audio signal 710 may comprise speech. The audio generation component 718 may identify the volume 706 of the audio signal 702 and the second volume 716 of the second audio signal 710.

The audio generation component 718 may alter the volume 706 and/or the second volume 716 until the volume 706 and the second volume 716 are within a threshold volume similarity 726. In an example, the volume 706 may be altered to equal the second volume 716, or the second volume 716 may be altered to equal the volume 706. In another example, a mean or average volume between the volume 706 and the second volume 716 may be determined. The volume 706 and the second volume 716 may be altered to comprise the mean or average volume. The audio generation component 718 may output the audio signal 702, having the volume 706 or the altered volume 722, and the second audio signal 728 having the second volume 716 or the second altered volume 730. The threshold volume similarity 726 may comprise a volume difference less than 2 decibels or some other volume difference.

In an example, the volume 706, a pitch, an amplitude, and/or a speech rate of the audio signal 702 and the second volume 716, a second pitch, a second amplitude, and/or a second speech rate of the second audio signal 710 may be altered until the audio signal 702 and the second audio signal 710 comprise a volume, pitch, amplitude, and/or speech rate within a similarity threshold.

Figure 8:
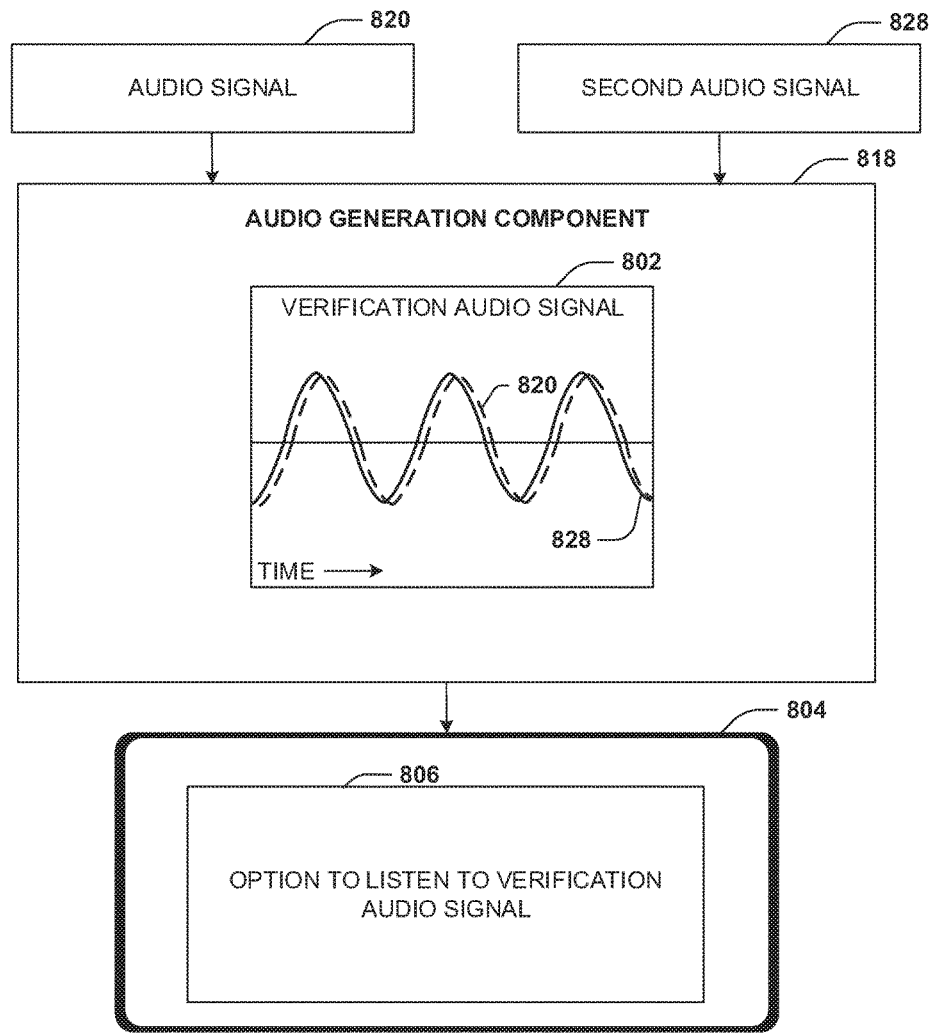
FIG. 8 is a component block diagram illustrating an example system for audio verification, where a user is presented with an option to listen to a verification audio signal.

FIG. 8 illustrates an example system 800 for audio verification comprising an audio generation component 818. An audio signal 820, comprising a code (e.g., a verification code such as ABCD or 1234) and a second audio signal 828 comprising one or more audio segments (e.g. a first audio segment and/or a second audio segment) may be combined to generate a verification audio signal 802. The second audio signal 828 may be created such that the second audio signal 828 has a same or similar length as the audio signal 820. The audio signal 820 and the second audio signal 828 may comprise a volume, pitch, amplitude, and/or speech rate within a similarity threshold. An option 806 to listen to the verification audio signal 802 may be presented to a user on a client device 804. In an example, the user may enter the code from the verification audio signal 802 into a text box (e.g., by typing 1234). In another example, the user may enter the code audibly and generate user input such as a user verification signal (e.g., by saying 1234). Responsive to the user entering the user input audibly, acoustic features of the user input that are indicative of a human voice may be identified. Responsive to the acoustic features indicating that the verification code was spoken by the human voice, the user may be verified to access content or a service. Responsive to the acoustic features indicating that the authentication code was not spoken by the human voice, the user may be denied access to the content or the service.

Figure 9:
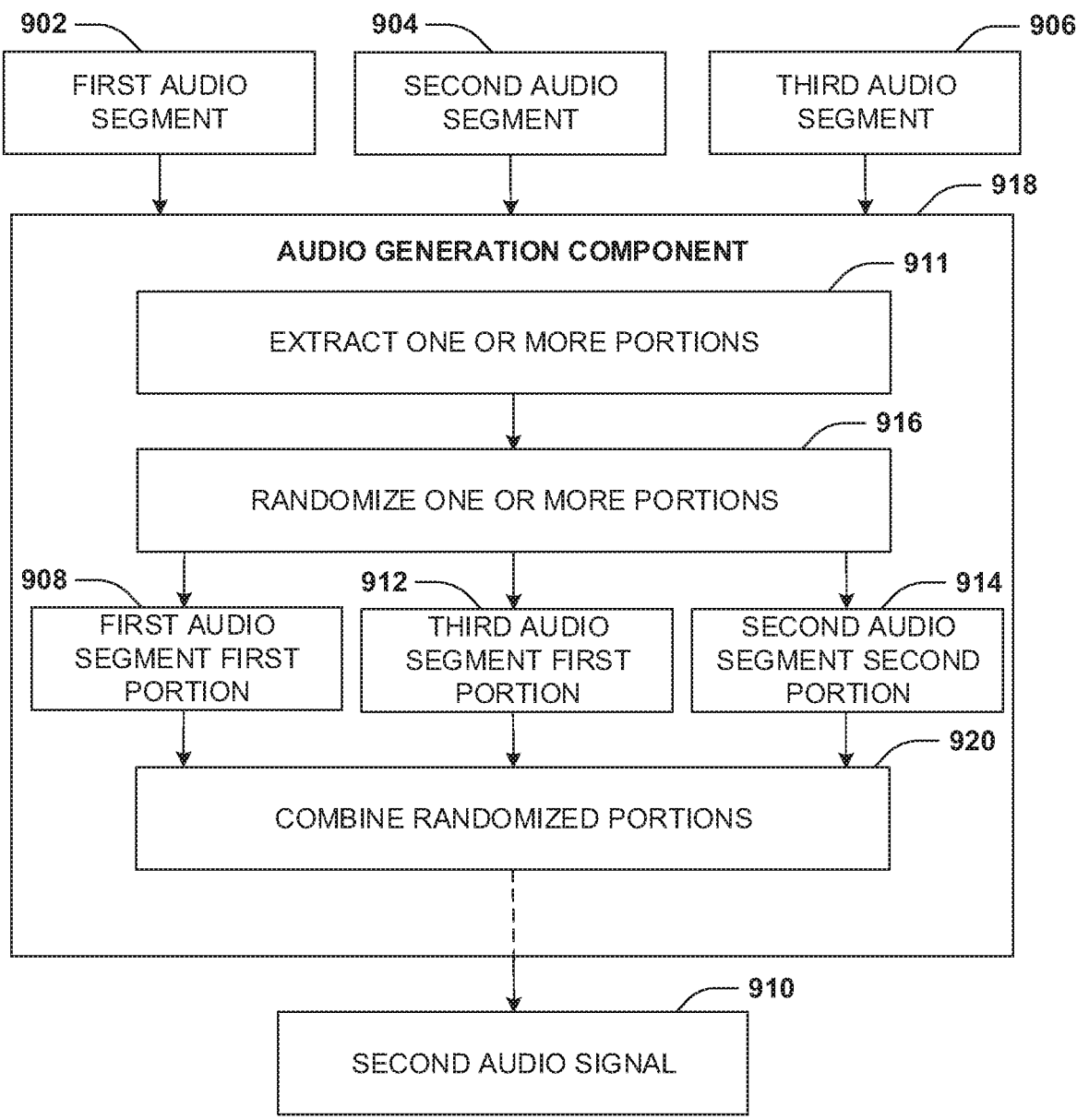
FIG. 9 is a component block diagram illustrating an example system for audio verification, where a second audio signal is created.

FIG. 9 illustrates an example system 900 for audio verification comprising an audio generation component 918 creating a second audio signal 910. The second audio signal 910 may be created utilizing a first audio segment 902, a second audio segment 904, and/or a third audio segment 906. The first audio segment 902, the second audio segment 90,4 and/or the third audio segment 906 may be extracted in real-time from an on-going audio stream (e.g., from a news show, a talk radio show, a morning talk show, etc.) from an audio content database (e.g., comprising one or more audio segments), and/or utilizing a random speech generator. In an example, the random speech generator may generate a sentence having syntax of a language (e.g., English). For example, the sentence may comprise an article, a verb and nouns (e.g., the, ran, dog, and home). However, the sentence may not make logical sense. For example, the sentence may be "the house ran dog." The random speech generator may provide an infinite number of sentences that may prevent a bot from learning often repeated audio signals.

The audio generation component 918 may extract 911 (e.g., randomly) one or more portions from the first audio segment 902, the second audio segment 904, and/or the third audio segment 906. The one or more portions may comprise a first audio segment first portion 908, a first audio segment second portion, and/or a first audio segment third portion extracted from the first audio segment 902. The one or more portions may comprise a second audio segment first portion, a second audio segment second portion 914, and/or a second audio segment third portion extracted from the second audio segment 904. The one or more portions may comprise a third audio segment first portion 912 and/or a third audio segment second portion extracted from the third audio segment 906. The one or more portions may be randomized 916 (e.g., to generate randomized portions) and combined 920 (e.g., stitched together) to generate the second audio signal 910. For example, the one or more portions may be randomized 916 so that the second audio signal 910 comprises the first audio segment first portion 908, the third audio segment first portion 912, and the second audio segment second portion 914 and combined 920.

In an example, the one or more portions (e.g., the randomized portions) may be layered (e.g., randomly) over each other to create a layered segment and/or a second layered segment. In an example, the third audio segment first portion 912 may be layered over the second audio segment third portion 4 times to comprise the layered segment, and the second audio segment second portion 914 may be layered over the second audio segment first portion to generate the second layered segment. The layered segment and/or the second layered segment may be stitched together to create the second audio signal 910. In an example, the one or more portions may be stitched together to create an initial second audio signal. The initial second audio signal may be reversed to create the second audio signal 910.

Figure 10:
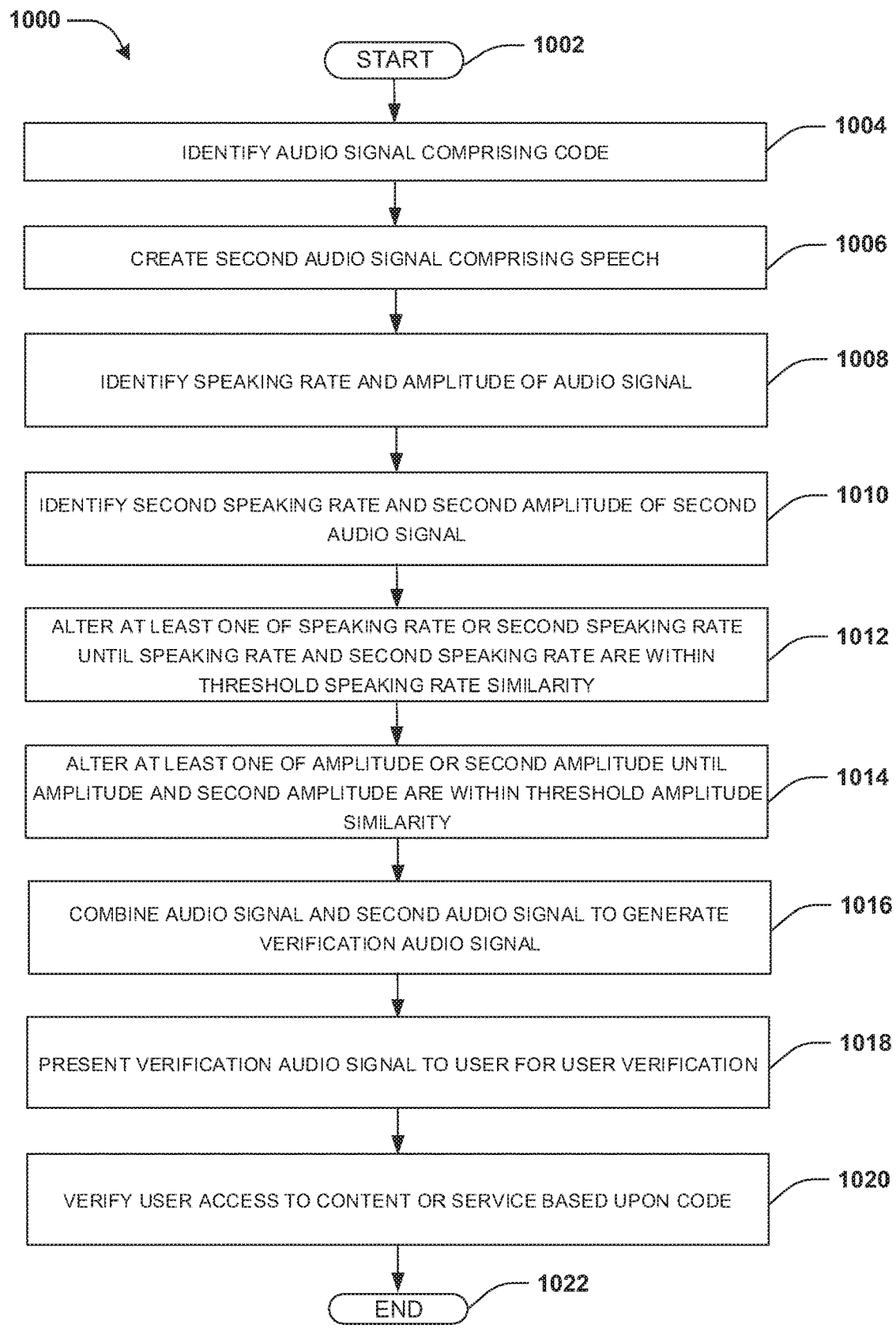
FIG. 10 is a flow chart illustrating an example method of audio verification.

An embodiment of content selection is illustrated by an example method 1000 of FIG. 10. At 1002, the method 1000 starts. At 1004, an audio signal comprising a code may be identified. At 1006, a second audio signal comprising speech may be created. At 1008, a speaking rate and an amplitude of the audio signal may be identified. At 1010, a second speaking rate and a second amplitude of the second audio signal may be identified. At 1012, the speaking rate and/or the second speaking rate may be altered until the speaking rate and the second speaking rate are within a threshold speaking rate similarity. At 1014, the amplitude and/or the second amplitude may be altered until the amplitude and the second amplitude are within a threshold amplitude similarity. At 1016, the audio signal and the second audio signal may be combined to generate a verification audio signal. At 1018, the verification audio signal may be presented to a user for user verification. At 1020, verification may be performed to determine whether the user has access to content or a service based upon user input, obtained in response to the user verification audio signal, matching the code within the user verification audio signal. At 1022, the method 1000 ends.

Figure 11:
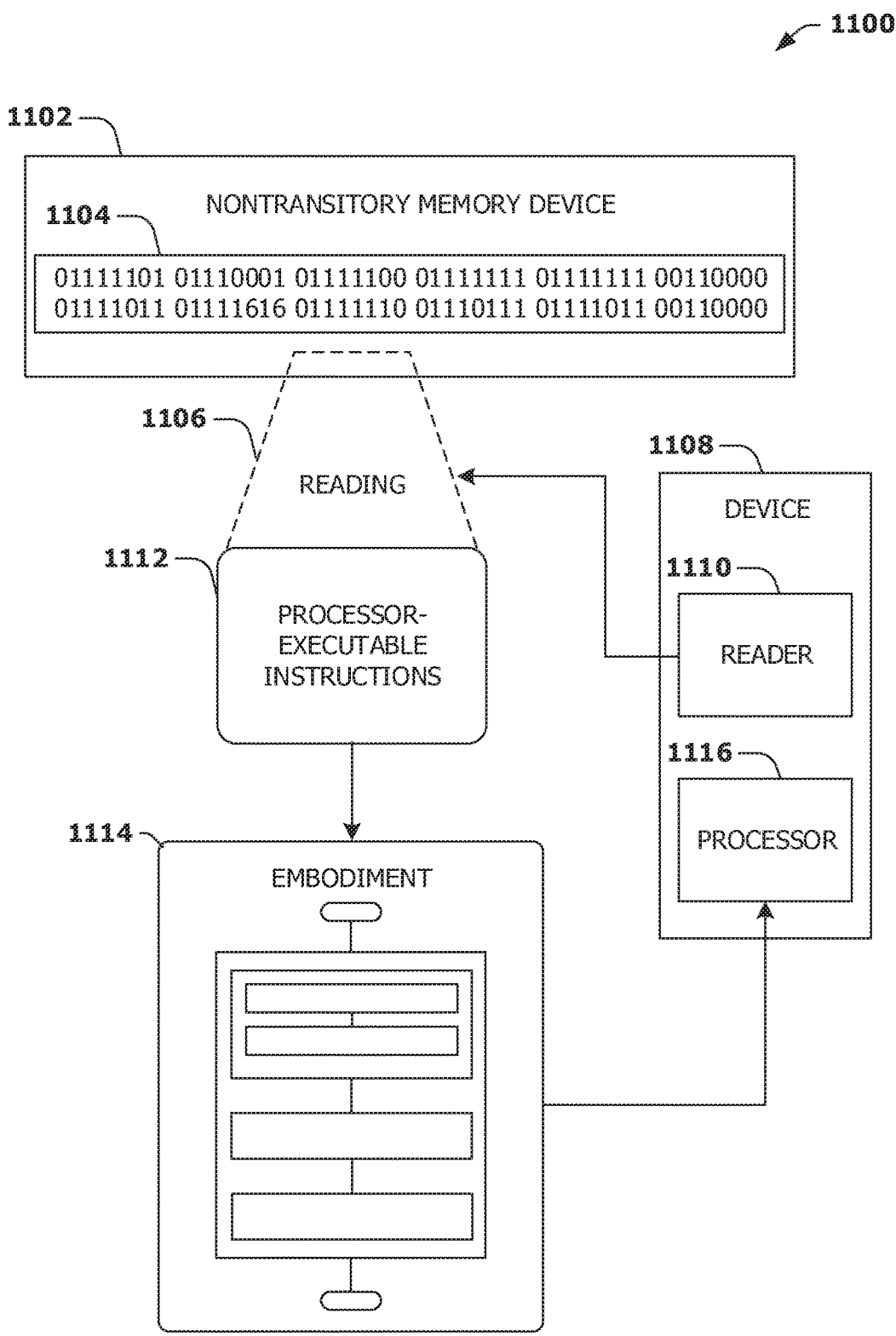
FIG. 11 is an illustration of a scenario featuring an example nontransitory memory device in accordance with one or more of the provisions set forth herein.

FIG. 11 is an illustration of a scenario 1100 involving an example nontransitory memory device 1102. The nontransitory memory device 1102 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 1102 stores computer-readable data 1104 that, when subjected to reading 1106 by a reader 1110 of a device 1108 (e.g., a read head of a hard disk drive, or a read operation invoked on a solid-state storage device), express processor-executable instructions 1112. In some embodiments, the processor-executable instructions, when executed on a processor 1116 of the device 1108, are configured to perform a method, such as at least some of the example 1000 of FIG. 10, for example. In some embodiments, the processor-executable instructions, when executed on the processor 1116 of the device 1108, are configured to implement a system, such as at least some of the example system 400 of FIG. 4, at least some of the example system 500 of FIG. 5, at least some of the example system 600 of FIG. 6, at least some of the example system 700 of FIG. 7, at least some of the example system 800 of FIG. 8, and/or at least some of the example system 900 of FIG. 9, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system of audio verification comprising:
   a processor; and
   memory comprising processor-executable instructions that when executed by the processor cause implementation of an audio generation component configured to:
      identify an audio signal comprising a code for user verification;
      create a second audio signal based upon one or more audio segments;
      identify a pitch and a volume of the audio signal at a first time;
      identify a second pitch and a second volume of the second audio signal at a second time;
      determine an average pitch between the pitch of the audio signal and the second pitch of the second audio signal;
      determine an average volume between the volume of the audio signal and the second volume of the second audio signal;
      alter the pitch of the audio signal and the second pitch of the second audio signal to be the average pitch at a third time;
      alter the volume of the audio signal and the second volume of the second audio signal to be the average volume at a fourth time;
      combine the audio signal and the second audio signal to generate a verification audio signal in response to:
         determining that the pitch of the audio signal at the third time and the second pitch of the second audio signal at the third time are both the average pitch so that a bot is unable to discern a difference between the pitch of the audio signal and the second pitch of the second audio signal when the audio signal and the second audio signal are combined; and
         determining that the volume of the audio signal at the fourth time and the second volume of the second audio signal at the fourth time are both the average volume so that a bot is unable to discern a difference between the volume of the audio signal and the second volume of the second audio signal when the audio signal and the second audio signal are combined;

present the verification audio signal to a user for the user verification, the user verification comprising verifying that the user is human; and verify whether the user has access to content or a service based upon user input, obtained in response to the verification audio signal, matching the code within the verification audio signal.

2. The system of claim 1, the audio generation component configured to:

identify a speaking rate of the audio signal; and
identify a second speaking rate of the second audio signal.

3. The system of claim 2, the audio generation component configured to:

alter at least one of the speaking rate of the audio signal or the second speaking rate of the second audio signal until the speaking rate and the second speaking rate are within a threshold speaking rate similarity.

4. The system of claim 1, the audio generation component configured to:

identify an amplitude of the audio signal; and
identify a second amplitude of the second audio signal.

5. The system of claim 4, the audio generation component configured to:

alter at least one of the amplitude of the audio signal or the second amplitude of the second audio signal until the amplitude and the second amplitude are within a threshold amplitude similarity.

6. The system of claim 1, the audio generation component configured to:

create the second audio signal utilizing a first audio segment and a second audio segment.

7. The system of claim 6, the audio generation component configured to at least one of:

extract at least one of the first audio segment or the second audio segment from an audio content database; or
generate at least one of the first audio segment or the second audio segment utilizing a random speech generator.

8. The system of claim 6, the audio generation component configured to:

randomly extract one or more portions from at least one of the first audio segment or the second audio segment; and
randomly stitch the one or more portions together to create the second audio signal.

9. The system of claim 6, the audio generation component configured to:

randomly extract one or more portions from at least one of the first audio segment or the second audio segment;
randomly layer the one or more portions over each other to create a layered segment and a second layered segment; and
stitch the layered segment and the second layered segment together to create the second audio signal.

10. The system of claim 6, the audio generation component configured to:

randomly extract one or more portions from at least one of the first audio segment or the second audio segment;
randomly stitch the one or more portions together to create an initial second audio signal; and
reverse the initial second audio signal to create the second audio signal.

11. The system of claim 1, wherein the second audio signal comprises computer generated speech.

12. The system of claim 1, the audio generation component configured to:

provide the user with an option to enter the user input audibly;
responsive to the user entering the user input audibly, identify acoustic features that are indicative of a human voice; and
responsive to the acoustic features indicating that the user input was spoken by the human voice, verify the user access to the content or the service.

13. The system of claim 1, the audio generation component configured to:

provide the user an option to enter the user input audibly;
responsive to the user entering the user input audibly, identify acoustic features that are indicative of a human voice; and
responsive to the acoustic features indicating the user input was not spoken by a human voice, deny the user access to the content or the service.

14. A method of audio verification comprising:

identifying an audio signal comprising a code for user verification;
creating a second audio signal based upon one or more audio segments;
identifying a speaking rate and an amplitude of the audio signal at a first time;
identifying a second speaking rate and a second amplitude of the second audio signal at a second time;
altering the speaking rate of the audio signal and the second speaking rate of the second audio signal by altering the speaking rate be more similar to the second speaking rate at the second time and altering the second speaking rate to be more similar to the speaking rate at the first time;
altering the amplitude of the audio signal and the second amplitude of the second audio signal by altering the amplitude be more similar to the second amplitude at the second time and altering the second amplitude to be more similar to the amplitude at the first time;
combining the audio signal and the second audio signal to generate a verification audio signal in response to:
 determining that a bot is unable to discern a difference between the speaking rate of the audio signal and the second speaking rate of the second audio signal when the audio signal and the second audio signal are combined; and
 determining that a bot is unable to discern a difference between the amplitude of the audio signal and the second amplitude of the second audio signal when the audio signal and the second audio signal are combined;
presenting the verification audio signal to a user for the user verification, the user verification comprising verifying that the user is human; and
verifying whether the user has access to content or a service based upon user input, obtained in response to the verification audio signal, matching the code within the verification audio signal.

15. The method of claim 14, comprising:

identifying a pitch of the audio signal;
identifying a second pitch of the second audio signal; and
altering at least one of the pitch of the audio signal or the second pitch of the second audio signal until the pitch and the second pitch are within a threshold pitch similarity.

16. The method of claim 14, comprising:
identifying a volume of the audio signal;
identifying a second volume of the second audio signal; and
altering at least one of the volume of the audio signal or the second volume of the second audio signal until the volume and the second volume are within a threshold volume similarity.

17. The method of claim 14, comprising:
creating the second audio signal utilizing a first audio segment and a second audio segment.

18. The method of claim 17, comprising at least one of:
extracting at least one of the first audio segment or the second audio segment from an audio content database; or
generating at least one of the first audio segment or the second audio segment utilizing a random speech generator.

19. A system of audio verification comprising:
a processor; and
memory comprising processor-executable instructions that when executed by the processor cause implementation of an audio generation component configured to:
identify an audio signal comprising a code for user verification;
create a second audio signal based upon one or more audio segments;
identify at least two of a pitch, an amplitude, a volume or a speaking rate of the audio signal;
identify at least two of a second pitch, a second amplitude, a second volume or a second speaking rate of the second audio signal;
at least two of:
alter at least one of the pitch of the audio signal or the second pitch of the second audio signal;
alter at least one of the volume of the audio signal or the second volume of the second audio signal;
alter at least one of the amplitude of the audio signal or the second amplitude of the second audio signal; or
alter at least one of the speaking rate of the audio signal or the second speaking rate of the second audio signal;
combine the audio signal and the second audio signal to generate a verification audio signal in response to at least two of:
determining that a bot is unable to discern a difference between the pitch of the audio signal and the second pitch of the second audio signal when the audio signal and the second audio signal are combined;
determining that a bot is unable to discern a difference between the volume of the audio signal and the second volume of the second audio signal when the audio signal and the second audio signal are combined;
determining that a bot is unable to discern a difference between the amplitude of the audio signal and the second amplitude of the second audio signal when the audio signal and the second audio signal are combined; or
determining that a bot is unable to discern a difference between the speaking rate of the audio signal and the second speaking rate of the second audio signal when the audio signal and the second audio signal are combined;
present the verification audio signal to a user for the user verification, the user verification comprising verifying that the user is human; and
verify whether the user has access to content or a service based upon user input, obtained in response to the verification audio signal, matching the code within the verification audio signal.

20. The system of claim 19, the one or more audio segments extracted in real-time from an on-going audio stream corresponding to at least one of a news show, a radio show or a talk show.

* * * * *